United States Patent
Berger et al.

[19]

[11] Patent Number: 5,817,730

[45] Date of Patent: *Oct. 6, 1998

[54] ORGANOSILICONE HAVING A CARBOXYL FUNCTIONAL GROUP THEREON

[75] Inventors: Abe Berger, Summit; Dennis L. Fost, Ridgewood, both of N.J.

[73] Assignee: Mona Industries, Inc., Paterson, N.J.

[ * ] Notice: The term of this patent shall not extend beyond the expiration date of Pat. No. 5,596,061.

[21] Appl. No.: 651,730

[22] Filed: May 22, 1996

Related U.S. Application Data

[63] Continuation-in-part of Ser. No. 420,746, Apr. 12, 1995, Pat. No. 5,596,061, which is a continuation-in-part of Ser. No. 298,568, Aug. 31, 1994, abandoned.

[51] Int. Cl.$^6$ .................................................. C08G 77/04

[52] U.S. Cl. ................................ 528/26; 528/25; 528/38; 548/406

[58] Field of Search ................................. 528/26, 25, 38; 548/406

[56] References Cited

U.S. PATENT DOCUMENTS

| | | | |
|---|---|---|---|
| 4,153,641 | 5/1979 | Diechert et al. | 528/32 |
| 5,459,205 | 10/1995 | Furukawa et al. | 556/413 |
| 5,596,061 | 1/1997 | Berger et al. | 528/26 |

*Primary Examiner*—Melvyn I. Marquis
*Attorney, Agent, or Firm*—Franklyn Schoenberg; Norman E. Lehrer

[57] ABSTRACT

A polysiloxane composition including an amphoteric class of organosilicone composition is provided having the formula:

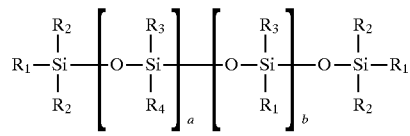

wherein:

$R_1$, which can be the same or different, is selected from $R_2$, a diamine containing group of the forumula $-F_1-B-F-NH_3$ and at least one pyrrolidone-containing functional carboxyl group of the general formula:

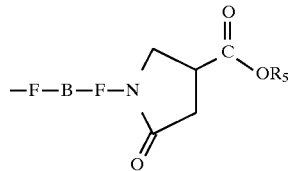

wherein $R_5$ is hydrogen, lower alkyl ($C_{1-6}$) or alkali metal; $F_1$ is linear or branched alkylene; F is linear or branched alkylene of 1–10 carbon atoms; B is $-NR_9$, wherein $R_9$ is hydrogen or lower alkyl ($C_{1-6}$);

$R_2$ can be the same or different and is selected from alkyl, aryl or olefinic;

$R_3$ and $R_4$, which may be the same or different are selected from alkyl, aryl, capped or uncapped polyoxyalkylene, alkaryl, aralkylene or alkenyl;

a is an integer from 0 to 50,000; and b is an integer from 0 to 100.

15 Claims, No Drawings

ORGANOSILICONE HAVING A CARBOXYL FUNCTIONAL GROUP THEREON

RELATED APPLICATION

This application is a continuation in part of application Ser. No. 420,746, filed Apr. 12, 1995 Pat. No. 5,596,061 which is a continuation-in-part of application Ser. No. 298,565 filed Aug. 31, 1994, abandoned.

FIELD OF THE INVENTION

The present invention relates to novel organosilicone compositions and, more particularly, to silicone compositions having a carboxyl functional group thereon.

BACKGROUND OF THE INVENTION

While some carboxyl functional organosilicones are known, they are generally difficult and expensive to prepare and the commercial use thereof has therefore been limited. Heretofore, no convenient method for directly preparing polysiloxanes containing functional carboxylic acid groups is known and indirect routes for their preparation have generally been used, such as hydrosilylation of an unsaturated ester followed by hydrolysis, or alternatively, by hydrolysis of nitrile-containing silicone fluids. However, polysiloxanes containing one or more functional groups such as amino and diamino functional groups are well known and have been used in a variety of commercial applications, but none of such polysiloxanes also contain functional carboxyl groups or provide an amphoteric class of organosilicones. Accordingly, the development of a method for readily and more directly preparing polysiloxanes containing one or more functional carboxyl groups would be desirable and it would be particularly advantageous if such method employed readily available silicone materials such as amino or diamino functional polysiloxanes for preparing not only a variety of carboxyl functional polysiloxanes including an amphoteric class of organosiloxanes but organosilicone derivatives thereof as well.

While, as indicated, certain polysiloxanes containing functional carboxylic acid groups and methods for preparing the same have heretofore been suggested, there is no disclosure or suggestion of the novel carboxyl functional silicone compositions or the method of preparing the same described in copending application Ser. No. 420,746 filed Apr. 12, 1995, Pat. No. 5,596,061 of which the present application is a continuation in part or of the novel carboxyl functional silicone and amphoteric class of silicone compositions of the present invention.

SUMMARY OF THE INVENTION

It is accordingly an object of the present invention to provide novel organosilicone compositions having at least one pyrrolidone-containing carboxyl functional group thereon.

It is another object of the present invention to provide a novel amphoteric class of organosilicone compositions.

It is a further object of the present invention to provide a method for directly and readily preparing organosilicone compositions having at least one pyrrolidone-containing carboxyl functional group thereon and particuarly an amphoteric class of organosilicone compositions.

It is still a further object of the present invention to provide cosmetic and personal care preparations which include novel carboxyl functional polysiloxane compositions, including an amphoteric class of polysiloxane compositions.

In accordance with the present invention, there has now been discovered novel polysiloxanes containing one or more carboxylic acid groups and/or the ester derivatives thereof that may be represented by the following general formula:

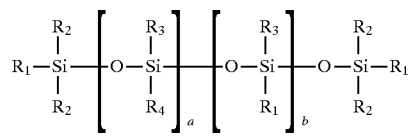

wherein:

$R_1$, which can be the same or different, can be selected from $R_2$, a diamine containing group of the formula —$F_1$—B—F—$NH_2$, and a pyrrolidone containing carboxyl functional group of the formula:

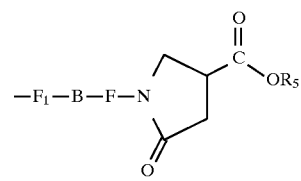

wherein at least one of $R_1$ is a pyrrolidone containing carboxyl or ester functional group or salt derivative thereof as shown; $F_1$ is linear or branched alkylene of 1–12 carbon atoms, preferably propylene and isobutylene; F is linear or branched alkylene of 1–10 carbon atoms, preferably ethylene; $R_2$ is as defined below; $R_5$ can be hydrogen, lower alkyl ($C_{1-6}$) or alkali metal; and B is —$NR_9$, wherein $R_9$ is hydrogen or lower alkyl ($C_{1-6}$);

$R_2$ can be the same or different and can be selected from alkyl, aryl and olefinic (vinyl);

$R_3$ and $R_4$, which may be the same or different, are selected from alkyl, aryl, capped or uncapped polyoxyalkylene, alkaryl, aralkylene and alkenyl (vinyl);

a can be an integer from 0 to 50,000; and b can be an integer from 0 to 100.

In another aspect of the present invention there is provided a method for preparing polysiloxanes containing one or more pyrrolidone-containing functional carboxylic acid groups and/or the ester derivatives thereof, and particularly an amphoteric class of polysiloxane compositions, which comprises reacting an organosilicone fluid or composition having at least one diamine functional group which must contain at least one primary amine group with itaconic acid or an ester derivative thereof at an elevated temperature (preferably from about 90° C. to about 130° C.) for a time sufficient to react, preferably substantially completely react (generally ranging from about 1–5 hours), the itaconic acid or ester thereof with the functional primary amine group(s) on the silicone fluid or composition to form an organosilicone composition having at least one pyrrolidone-containing carboxyl functional group.

In a further aspect of the present invention there is provided a novel silicone-modified amidoamine composition having the formula:

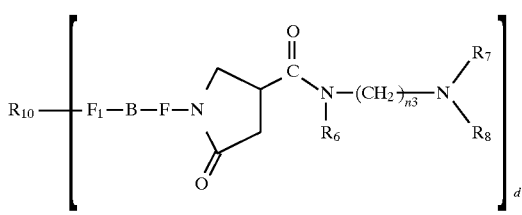

wherein:

$R_{10}$ is the silicone backbone chain as herein described to which at least one pyrrolidone containing amidoamine derivative of a pyrrolidone-containing carboxyl functional group can be attached as shown;

$R_6$ is hydrogen or alkyl, hydroxyalkyl or alkenyl of up to 6 carbon atoms each, cycloalkyl of up to 6 carbon atoms, or polyoxyalkylene of up to 10 carbon atoms within the oxyalkylene unit;

$R_7$ and $R_8$, which may be the same or different, are selected from alkyl, hydroxyalkyl, carboxyalkyl of up to 6 carbon atoms in each alkyl; and polyoxyalkylene of up to 10 carbon atoms; in addition $R_7$ and $R_9$ taken together with the nitrogen to which they are attached may represent an N-heterocycle;

$n^3$ is an integer from 2 to 12;

B is —$NR_9$, wherein $R_9$ is hydrogen or lower alkyl ($C_{1-6}$);

$F_1$ is branched or linear alkylene of 1–12 carbon atoms;

F is branched or linear alkylene of 1–10 carbon atoms; and d is at least one.

In a still further aspect of the present invention there is provided cosmetic and personal care preparations which contain from 0.1% to 10% of novel polysiloxanes containing one or more pyrrolidone-containing functional carboxyl groups and/or t he ester or amidoamine derivatives thereof.

DESCRIPTION OF THE PREFERRED EMBODIMENTS

In accordance with the present invention there are provided novel polysiloxanes comprising a class of carboxyl functional polysiloxanes including an amphoteric class of such polysiloxanes which may be represented by the general formula:

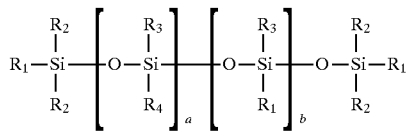

wherein:

$R_1$, which can be the same or different, can be selected from $R_2$, a diamine group of the formula —$F_1$—$NR_9$—F—$NH_2$ and a pyrrolidone containing carboxyl functional group of the general formula:

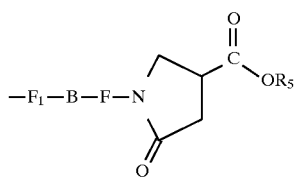

wherein at least one $R_1$ is a pyrrolidone-containing carboxyl or ester functional group or salt derivative thereof as shown;

$F_1$ is linear or branched alkylene of 1–12 carbon atoms, preferably propylene and isobutylene; F is linear or branched alkylene of 1–10 carbon atoms, preferably ethylene; $R_2$ is as defined below; $R_5$ is hydrogen, alkyl, preferably lower alkyl ($C_{1-6}$), or an alkali metal; and B is —$NR_9$, wherein $R_9$ is hydrogen or lower alkyl ($C_{1-6}$);

$R_2$ can be the same or different and can be selected from alkyl, aryl and olefinic (vinyl);

$R_3$ and $R_4$, which may be the same or are selected from alkyl, aryl, capped or uncapped polyoxyalkylene, alkaryl, aralkylene and alkenyl (vinyl);

a can be an integer from 0 to 50,000; and b can be an integer from 0 to 100;

It is evident from the general formula above that the polysiloxane compositions of the present invention have one or more pyrrolidone-containing functional carboxyl or ester group(s) or salt derivative thereof linked terminally, laterally or both terminally and laterally to the silicone (polysiloxane) chain through a hydrocarbon linkage which contains at least one nitrogen atom.

The polysiloxane compositions including the amphoteric class of polysiloxanes according to the present invention are useful, for example, for reducing the friction of petroleum flow through pipelines and as additives for personal care products as well as being precursors for a wide range of personal care products, fiber treating agents and the like which impart such advantages as improved feel, substantivity, reduced surface tension, and anti-stick characteristics.

The novel functional carboxyl polysiloxanes and particularly the amphoteric class of polysiloxanes of the present invention surprisingly and unexpectedly can be readily and directly prepared by the reaction of corresponding silicone compositions or fluids having one or more functional diamine groups, each of which group(s) must contain a primary amine group, with up to about one equivalent, preferably about stoichiometric quantities, of itaconic acid or its ester per primary amine group portion of the functional diamine group(s) at an elevated temperature for the time sufficient for substantially all of the itaconic acid or its ester to react with the functional primary amine group(s). In general from about 0.5, preferably, from about 0.9 to about 1.1 equivalents of itaconic acid or its ester per functional primary amine group is reacted with the silicone fluid wherein substantially all the itaconic acid and preferably all the functional primary amine group(s) is reacted and a polysiloxane composition with at least one pyrrolidone-containing functional carboxyl group(s) and/or its ester or salt is formed.

The reaction can be carried out neat or in an inert solvent such as alcohol, hydrocarbon solvent, chlorinated hydrocarbon and the like, as desired, in general, at elevated temperature up to 175° C., preferably from about 90° C. to about 130° C. The reaction readily proceeds and generally complete reaction of the itaconic acid or its ester with the available functional primary amine groups and cyclization to form a pyrrolidone group will occur in from about 1 to 5 hours. Routine analytical techniques for amine and acid values as well as monitoring viscosity, color and water and/or alcohol evolution can be used to determine completion of the reaction.

Suitable functional diamine silicone fluids for use in accordance with the practice of the invention, having one or more functional diamine group(s) that contain a primary amine group, and which may be linked terminally, laterally or both terminally and laterally as desored via an alkylene linkage to silicon are well known and are available commercially, for example from Dow Corning, General Electric and Shin-Etsu. Exemplary suitable functional diamine silicone fluids are silicone fluids having one or more aminoalkylaminoalkylene functional groups include, for example, aminoethylaminopropyl functional silicone fluids such as KF 393 from Shin-Etsu and aminoethylaminoisobutyl functional silicone fluids such as X2-8107 and Q2-8220 from Dow Corning. While the equivalent weight of the silicone fluids or compositions which may be employed in the preparation of the pyrrolidone-containing carboxyl functional polysiloxanes of the present invention is not critical, and suitable compositions may have equivalent weights of 12,000 or even higher, although silicone fluids having equivalent weights from about 500 to about 12,000 are in general preferred.

As indicated, the pyrrolidone-containing carboxyl functional polysiloxane compositions including the amphoteric class of polysiloxanes of the present invention are readily prepared by reaction of diamino functional silicone fluids wherein each of the diamine groups must contain a primary amine with itaconic acid or its ester. Itaconic acid (methylene succinic acid) is a compound of the formula:

$$CH_2=C(COOR_9)CH_2COOR_9$$

wherein $R_9$, which can be the same or different, is hydrogen or lower alkyl (1–6 carbon atoms).

The compound itaconic acid is available commercially from Rhone Poulenc and Pfizer Chemicals Division whereas ester derivatives thereof are available from Morflex Inc., Greensboro, N.C. The compounds are produced by known fermentation techniques although chemical synthesis methods are also known.

In another aspect of the present invention, there are provided novel silicone-containing amidoamine compositions that are suitable for use as surfactants and a variety of other applications as well as intermediate reactants preferably for use in the preparation of derivatives of the novel pyrrolidone-containing functional carboxyl polysiloxane compositions of the invention as hereinabove described. The novel amidoamine compositions of the invention may be represented by the general formula:

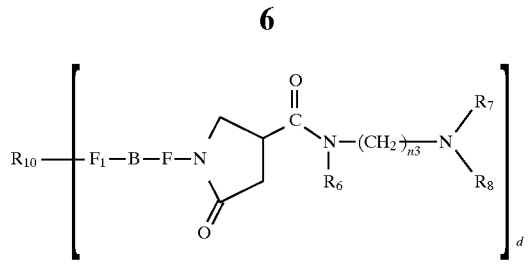

wherein:

$R_{10}$ is a silicone backbone chain as herein described to which at least one pyrrolidone-containing carboxyl functional group or amidoamine derivative thereof is attached as hereinabove shown;

$R_6$ is hydrogen or alkyl, hydroxyalkyl or alkenyl up to 6 carbon atoms each, cycloalkyl of up to 6 carbon atoms or polyoxyalkylene of up to 10 carbon atoms, preferably from 2 to 5 carbon atoms, within the oxyalkylene unit and at least one $R_6$ is hydrogen;

$R_7$ and $R_8$, which may be the same or different, are selected from alkyl, hydroxyalkyl, carboxyalkyl of up to 6 carbon atoms in each alkyl, and polyoxyalkylene of up to 10 carbon atoms; in addition $R_7$ and $R_8$ taken together with the nitrogen to which they are attached may represent N-heterocycle;

$F_1$ is linear or branched alkylene of 1–12 carbon atoms, preferably propylene and isobutylene;

F is linear or branched alkylene of 1–10 carbon atoms, preferably ethylene;

B is —$NR_9$, wherein $R_9$ is hydrogen or lower alkyl($C_{1-6}$);

$n^3$ is an integer from 2 to 12; and d is an integer from 1 or greater, generally from 1–50 and preferably 2–10.

The novel silicone-containing amidoamine compositions of the invention can be prepared as follows:

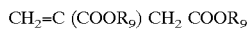

wherein:

$R_{10}$ is a silicone backbone chain as herein described to which at least one pyrrolidone-containing carboxyl functional group or amidoamine derivative thereof is attached as hereinabove shown;

$R_5$ is hydrogen, lower alkyl ($C_{1-6}$) or alkali metal;

$R_6$ is hydrogen or alkyl, hydroxyalkyl or alkenyl up to 6 carbon atoms each, cycloalkyl of up to 6 carbon atoms or polyoxyalkylene of up to 10 carbon atoms, preferably from 2 to 5 carbon atoms, within the oxyalkylene unit and at least one $R_6$ is hydrogen;

$R_7$ and $R_8$, which may be the same or different, are selected from alkyl, hydroxyalkyl, carboxyalkyl of up to 6 carbon atoms in each alkyl, and polyoxyalkylene of up to 10 carbon atoms; in addition $R_7$ and $R_8$ taken together with the nitrogen to which they are attached may represent an N-heterocycle;

$F_1$ is linear or branched alkylene of 1–12 carbon atoms;

F is linear or branched alkylene of 1–10 carbon atoms;

B is —$NR_9$, wherein $R_9$ is hydrogen or lower alkyl;

$n_3$ is an integer from 2 to 12;

d and D is an integer from 1 or greater, generally from 1–50 and preferably 2–10. The reactant ratio of the amine reactant to the carboxyl reactant on the silicon is preferably 1:1 but can be varied in ratio from 1:0.8 to 1:1.2.

Silicone-containing amidoamines of the invention are readily prepared by the above coupling reaction from the novel polysiloxane compositions of the present invention having one or more pyrrolidone-containing functional carboxyl group(s) as hereinabove described.

The above coupling reaction for preparing the silicone-containing amidoamine compositions can be carried out neat or can be carried out in an inert solvent such as xylene, toluene, chlorobenzene or the like. While the equivalent weight of the silicone-containing amidoamine compositions is not critical, preferably the equivalent weight of such compositions will range from about 500 to 15000.

The novel pyrrolidone-containing carboxyl functional polysiloxane compositions including the amphoteric class of polysiloxanes and the amidoamine derivatives thereof display many of the well known properties of silicone such as emolliency, detackification, smoothing, lubrication and sufactancy properties while, in addition, making them suitable as precursor reactors for the preparation of a variety of silicone-containing derivatives. In this connection, the novel compositions of the invention are suitable for the preparation of silicone-containing compositions which exhibit the unique property of water-dispersibility or solubility and substantivity.

It is therefore a further aspect of the invention to use the novel compositions of the invention, for example, in cosmetic and the like personal care preparations, especially in preparations for skin treatment and hair care. In this connection, personal care formulations can be hair conditioners and skin-treatment cremes and lotions. Other formulations where the unique properties of the novel compositions of the invention can be utilized include make-up cremes, sunscreens, lipstick, pressed powders, skin-toners, deodorants, antiperspirants and the like. Personal care preparations to which the novel compositions of the inventions have been added in amounts of 0.1% to 10% weight percent, and can contain other additives, provide skin treating products with non-irritating, non-greasy film on the skin that does not evaporate and therefore provides long lasting protection. In addition, these novel compositions demonstrate useful hair "dressing" characteristics.

Among other advantages of the novel carboxyl functional polysiloxanes of the invention are their usefulness as paper and textile sizing and lubricating agents; treating agents for fillers, paper and plastics; anticorrosion agents for metal products, and the like.

The preparation of specific compositions of the invention is illustrated by the following specific examples which are provided herein for purposes of illustration only and are not intended to limit the scope therein.

EXAMPLE 1

An aminoethyl aminopropyl trimethyl silyl capped silicone fluid having an amine equivalent weight of about 760 obtained commercially under the designation KF 393 from Shin-Etsu is used in this example.

228 grams of the above polysiloxane fluid (0.3 Equivalents) is admixed with 39 grams (0.3 moles) of Itaconic Acid in a reaction vessel. External heat is slowly applied to the reaction vessel bringing the reaction mixture to a temperature of about 120° C., whereupon an exotherm occurs raising the temperature to 130° C. The reaction mixture is stirred at about 125° C. for 3 additional hours. With the Itaconic acid being uniformly dispersed in the reaction mixture. A clear yellow viscous oil is prepared which does not flow at room temperature. The reaction product flows when heated and is readily soluble in ethanol.

The acid value of the reaction product is 57.5 (theoretical 64.3) while the alkali number is 64.3, (theoretical 64.3) confirming that there is the presence of carboxyl groups and amine groups on the product.

EXAMPLE 2

A Bis (Trimethylsiloxy capped) aminoethyl aminoisobutyl methylsiloxy co-dimethylsiloxy containing fluid obtained from Dow Corning Corp. under the trade designation X2-8107 is used in this example. The silicone fluid has an amine content of 0.25 percent which corresponds to an equivalent weight of 12,800.

A mixture of 128 grams of the silicone fluid and 1.3 grams of Itaconic acid is formed in a reaction vessel and heated to 125° C. The reaction mixture becomes very viscous and yellow in color with small amounts of water being evolved.

The mixture is heated for 3 hours at 125° C. with agitation and a viscous fluid is prepared. The reaction mixture is flowable at room temperature although very viscous. The reaction mixture has an acid number of 3.4 and alkali number of 4.7 (theoretical for both is 4.3).

EXAMPLE 3

Another sample of the polysiloxane fluid used in example 1 is used in this example.

38 grams (0.05 moles) of the above siloxane fluid is admixed with 6.5 grams (0.05 moles) of Itaconic acid. The mixture is heated to 120° C. whereupon an exotherm occurs raising the temperature to 130° C. The reaction mixture is heated and maintained at a temperature of 120°–130° C. for 3 hours.

There is then added to the reaction mixture 15.3 grams (200% excess) of dimethylamino propylamine (DMAPA) and the reaction mixture becomes very fluid. The temperature is raised to 165° C. where it is held for three additional hours while volatiles are collected. The reaction mixture is subjected to vacuum stripping to remove excess DMAPA at a reaction vessel temperature of 100° C. and a vacuum of 30 mm. The alkali number of the reaction product residue is 135 corresponding to an equivalent weight of 831.

EXAMPLE 4

A pendant (lateral) amino functional silicone fluid having an average equivalent weight of 4080 obtained from Dow Corning under the product designation Q2-8220 is used in this example.

81.6 grams (0.02 moles) of the silicone fluid is admixed with 2.6 grams of Itaconic acid (0.02 moles) in a reaction vessel and heated to a temperature of 125°–130° C. whereupon a viscous yellow oil is obtained and heating is continued for an additional four hours.

After cooling, the reaction product is a viscous non-flowable product. The reaction product is soluble in isopropanol.

EXAMPLE 5

Skin care creme compositions are prepared having the following proportion of ingredients. The pyrrolidone-containing carboxyl funcational polysiloxanes compositions of example 2 and example 4 are used in this example.

| PART | RAW MATERIAL | SAMPLE A % BY WT. | SAMPLE B % BY WT. |
|---|---|---|---|
| A | Cetyl Phosphate (Monafax 160) | 0.5 | 0.5 |
| A | Potassium Hydroxide (45% in H₂O) | 0.2 | 0.2 |
| A | Deionized Water | 76.25 | 77.11 |
| B | Glycerine | 10.0 | 10.0 |
| B | Propylene Glycol Stearate | 5.0 | 4.0 |
| B | Cetyl Alcohol | 2.0 | 2.0 |
| B | Glyceryl Monostearate | 3.0 | 3.0 |
| B | Example 4 Amphoteric Silicone (50% in Ethanol) | 3.0 | |
| B | Lactic Acid | 0.05 | 0.19 |
| B | Example 2 Amphoteric Silicone (50% in Isopropyl Palmitate) | — | 3.0 |

Heat Parts A and B individually to 75° C. with stirring. Add Part B slowly to Part A with stirring. Cool with mixing to 30° C.

Both formulations yield smooth glossy cremes which spread easily, break quickly and impart a smooth non-greasy emmolliency to the skin. The smooth afterfeel on the skin persists even after exposure to water suggesting utilization of these silicone compositions in water-resistant skin-protection cremes, suntan products and make-up.

EXAMPLE 6

The pyrrolidone-containing carboxyl functional silicone composition of example 1 is used in this example. Hair conditioning spray/dip and hair shampoo formulations are prepared having the following proportion of ingredients.

Evalutation in a Hair Conditioning Spray/Dip

| Raw Material | Test Sample % by Weight |
|---|---|
| Amphoteric Silicone (Example 1) (25% in isopropanol) | 4.0 |
| Ethanol | 95.8 |
| Lactic Acid (88% in H₂O) | 0.2 |
| | 100.0 |

The addition of lactic acid makes the initially cloudy dispersion clear (pH=5.0 @ 10% in H₂O). This formula yields a fine mist when used in a hand-pumped aerosol dispenser.

A hair swatch dipped in the test sample and dried, exhibits curl retention, good wet-and-dry combing properties, a silkier texture and better residual gloss versus a water-treated swatch indicating the suitability of the silicone composition as an additive in hair grooming/conditioning products.

Amphoteric Silicone Compatible in Shampoo Base

| Raw Material | Test Sample % by Weight |
|---|---|
| Ammonium Lauryl Sulfate (28% active) | 46.4 |
| Ammomium Lauryl Ether Sulfate (26% active) | 27.0 |
| Coconut Monoethanolamide | 3.0 |
| Ammonium Xylene Sulfonate (40% active) | 5.0 |
| Example 1 Silicone (25% in isopropanol) | 10.0 |
| Lactic Acid (88% in water) | 1.0 |
| Water | 7.6 |
| | 100.0 |

The resulting shampoo with 2.5% active amphoteric silicone of example 1 is clear and a hair tress washed in this shampoo and then rinsed with water exhibited acceptable wet combing properties.

Although some preferred embodiments have been described, many modifications and variations may be made thereto in light of the above teachings. It is therefore to be understood that within the scope of the appended claims, the invention may be practiced otherwise than as specifically described and illustrated.

What is claimed is:

1. A polysiloxane composition having the formula

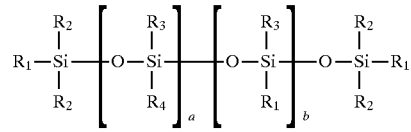

wherein:

$R_1$, which can be the same or different, is selected from $R_2$, a diamine containing group of the forumula —$F_1$—B—F—$NH_3$ or a pyrrolidone-containing functional carboxyl group of the general formula:

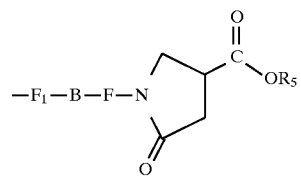

wherein at least one $R_1$ is a pyrrolidone containing functional carboxyl group or or derivative thereof as shown; $R_2$ is as defined below; $R_5$ is hydrogen, lower alkyl ($C_{1-6}$) or alkali metal; $F_1$ is linear or branched alkylene of 1–12 carbon atoms; F is linear or branched alkylene of 1–10 carbon atoms; B is —$NR_9$, wherein $R_9$ is hydrogen or lower alkyl ($C_{1-6}$);

$R_2$ can be the same or different and is selected from alkyl, aryl or olefinic;

$R_3$ and $R_4$, which may be the same or different are selected from alkyl, aryl, capped or uncapped polyoxyalkylene, alkaryl, aralkylene or alkenyl;

a is an integer from 0 to 50,000; and b is an integer from 0 to 100.

2. The polysiloxane composition as claimed in claim 1, wherein $R_5$ is hydrogen or lower alkyl.

3. The polysiloxane composition as claimed in claim 1, wherein $R_1$ is $R_2$ or a pyrrolidone-containing carboxyl functional group or ester derivative thereof and at least one of $R_1$ is a pyrrolidone-containing carboxyl functional group or ester derivative thereof.

4. The polysiloxane composition as claimed in claim 1, wherein at least one terminally linked $R_1$ group is a pyrrolidone containing carboxyl functional group or derivative thereof.

5. The polysiloxane composition as claimed in claim 1, wherein $R_3$ and $R_4$ are methyl and a is at least 1.

6. The polysiloxane composition as claimed in claim 1, wherein both terminal $R_1$ groups are $R_2$ and a and b are each at least 1.

7. The polysiloxane composition as claimed in claim 1, wherein $R_2$, $R_3$ and $R_4$ are methyl.

8. The polysiloxane composition as claimed in claim 1, wherein $R_9$ is hydrogen.

9. A method for preparing polysiloxane compositions containing at least one pyrrolidone-containing carboxyl functional group or the ester derivatives thereof, which comprises reacting an organosilicone composition having at least one diamine functional group containing a primary amine group with itaconic acid or an ester derivative thereof at an elevated temperature for a time sufficient to react substantially all the itaconic acid or ester derivative thereof with the primary amine groups on the silicone composition and to form an organosilicone composition having at least one pyrrolidone containing carboxyl functional group.

10. The method for preparing polysiloxane compositions as claimed in claim 9, wherein said organosilicone composition having at least one diamine functional group containing a primary amine group is substantially compatible with said itaconic acid or ester derivative thereof at the reaction temperature and forms a homogeneous reaction mixture therewith.

11. The method for preparing polysiloxane compositions as claimed in claim 9, wherein reaction of said organosilicone composition having at least one diamine functional group and itaconic acid or ester is carried out at a temperature from about 90° C. to about 130° C.

12. The method for preparing polysiloxane compositions as claimed in claim 9, wherein about a stoichiometric amount of itaconic acid or its ester derivative per primary amine group on the functional diamine group(s) is employed in said reaction.

13. The method for preparing polysiloxane compositions as claimed in claim 9, wherein said organosilicone composition has one or more terminal or lateral diamine functional groups attached to a silicone group on the silicone chain.

14. A silicone-containing amidoamine composition having the formula:

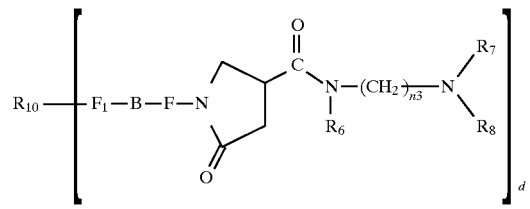

wherein:

$R_{10}$ is a silicone backbone chain to which at least one pyrrolidone-containing amidoamine derivative of a pyrrolidone-containing carboxyl functional group as shown is attached;

$R_6$ is hydrogen or alkyl, hydroxyalkyl or alkenyl of up to 6 carbon atoms each, cycloalkyl of up to 6 carbon atoms, or polyoxyalkylene of up to 10 carbon atoms within the oxyalkylene unit;

$R_7$ and $R_8$, which may be the same or different, are selected from alkyl, hydroxyalkyl, cycloalkyl or carboxyalkyl of up to 6 carbon atoms in each alkyl or polyoxyalkylene of up to 10 carbon atoms; or in addition $R_7$ and $R_8$ taken together with the nitrogen to which they are attached represents an N-heterocycle.

$F_1$ is linear or branched alkylene of 1–12 carbon atoms;

F is linear or branched alkylene of 2–10 carbon atoms;

$n^3$ is at least 1;

B is —$NR_9$, wherein $R_9$ is hydrogen or lower alkyl; and d is at least one.

15. A personal care and cosmetic composition comprising at least 0.1% of a polysiloxane composition as claimed in claim 1.

* * * * *

UNITED STATES PATENT AND TRADEMARK OFFICE
CERTIFICATE OF CORRECTION

PATENT NO.    : 5,817,730
DATED         : October 6, 1998
INVENTOR(S)   : Fost & Berger It is certified that error appears in the above-identified patent and that said Letters Patent is hereby corrected as shown below:

Column 10,
Line 41, delete "$R_2$"
Line 42, delete "$NH_3$" and insert -- $NH_2$ --
Line 54, delete "or" (second occurrence)
Lines 54-55, delete "$R_2$ is defined below;"
Delete lines 59-67 (Claims 3 and 4)

Column 12,
Delete lines 8-40 (Claim 14)

Signed and Sealed this

Ninth Day of December, 2003

JAMES E. ROGAN
*Director of the United States Patent and Trademark Office*